July 19, 1938.     I. GUIDUCCI     2,124,249
LOCKING WASHER FOR NUTS
Filed Aug. 13, 1935
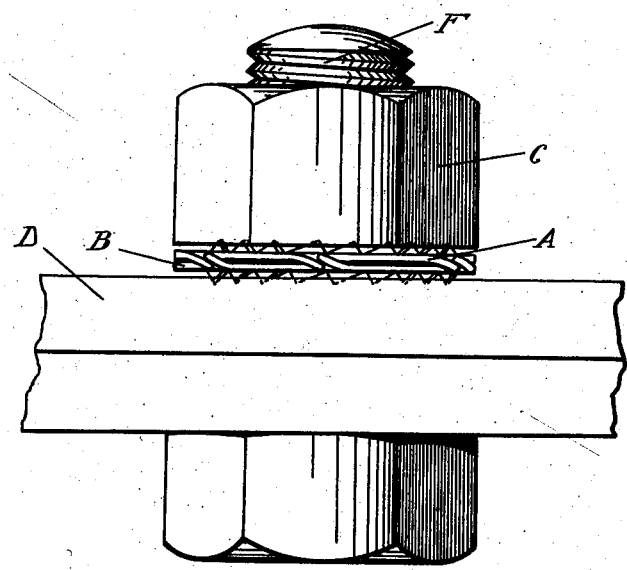
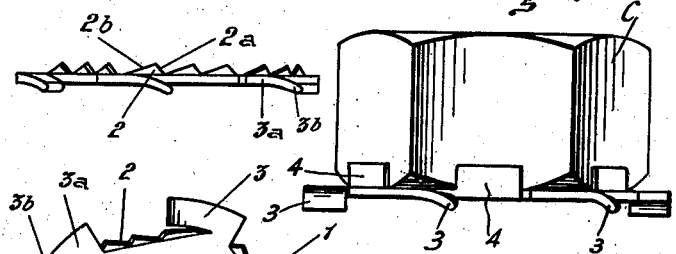
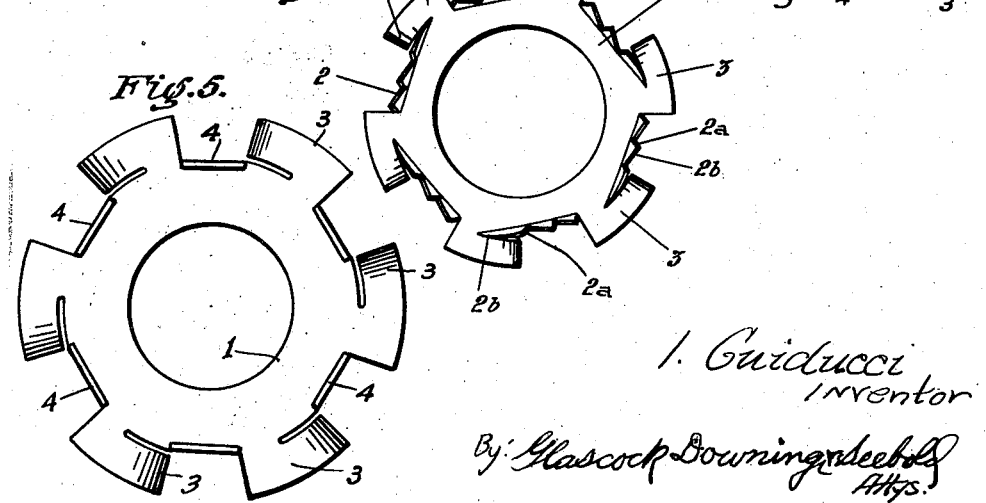
I. Guiducci
Inventor
By: Glascock Downing Seebold
Attys.

Patented July 19, 1938

2,124,249

UNITED STATES PATENT OFFICE 2,124,249

LOCKING WASHER FOR NUTS

Igino Guiducci, Tivoli, Italy

Application August 13, 1935, Serial No. 36,023
In Italy October 17, 1934

2 Claims. (Cl. 151—35)

The present invention relates to locking washers for nuts, and its object is to provide a double washer of simple and economical manufacture and at the same time one which is completely reliable in operation and which can be used without any previous preparation of the nut.

The double washer in accordance with the invention is composed of two equal or substantially equal simple washers, each having one face provided with projections adapted to engage the part with which the washer co-acts during the tightening-up of the nut, and one smooth face; each washer has in addition radial extensions so shaped as to permit the relative angular movement of the two washers in the direction in which the nut is tightened up but not the movement in the reverse direction.

The two washers are arranged with their smooth faces in contact with each other.

Other characteristics and advantages of the locking washer in accordance with the invention will become apparent in the course of the present description which is made with reference to the accompanying drawing, which represents by way of example two preferred embodiments of the invention.

In the drawing:

Fig. 1 is an elevation of a bolt provided with the preferred embodiment of double washer in accordance with the invention.

Fig. 2 is an elevation of a single washer.

Fig. 3 is a plan view from above of the washer shown in Fig. 2.

Fig. 4 is an elevation of a nut and of a washer of modified form, to be used preferably with nuts of hard steel.

Fig. 5 is a plan view from above of the washer shown in Fig. 4.

With reference to Figs. 1 to 3, each simple washer comprises an annular portion 1, whose internal diameter, i. e., the diameter of the hole, is slightly greater than the diameter of the bolt with which the washer is to be used, whilst the external diameter of the said annular part 1 is smaller than the diameter of the circle which is inscribed in the outline of the nut.

The periphery of the annular portion 1 is provided with projections 2, extending vertically relatively to the plane of the washer and preferably of triangular shape with a vertex which is asymmetrical relatively to the base of the triangle, in such a way that in each triangular projection there is a steep face 2a sloping in a counter-clockwise direction and a face 2b having a relatively gentle inclination sloping in the clockwise direction.

From the annular portion 1 there extend radially extensions 3, each of which has a portion 3a rigidly attached to and in the plane of the washer, and another annular portion 1 of the washer, and another portion 3b separated by a cutting from the said annular portion 1 and inclined downwards and backwards when the washer is seen as shown in Fig. 2 or Fig. 3 and turning in a clockwise direction.

Two washers are used in conjunction, as is shown in Fig. 1, i. e., with their smooth faces coacting with each other, in such a way that the aggregate formed by two washers has the projections 2 on both the external faces, which projections are intended to engage the nut and the surface of the part to be kept tight.

In practice the double washer may be put on the market with the two single component washers joined together by means of any adhesive grease.

In order to understand the operation of the washer, Fig. 1 will be considered supposing that the nut C is not yet tightened up.

As it is shown, the double washer formed by the two single washers A and B, arranged as has been already described, is threaded on the bolt E before the nut is put on. Then the nut is screwed on and it at first turns freely. When, however, the double washer A, B, begins to be pressed between the nut C and the part D, the points of the projections 2 commence to bite on the surfaces with which they are in contact, and namely the projections 2 of the washer A bite the face of the nut C, while those of the washer B bite the surface of the part D.

The washer B remains fixed, while the washer A is carried round by the nut C in its movement.

The inclined portions of the extensions 3 of the upper washer co-act with the inclined portions of the lower washer in such a way that, while permitting the tightening-up movement of the nut, they prevent the movement in the opposite direction.

It is obvious that there is a positive locking between the two washers in as many points of the circumference as there are extensions on each washer.

In this connection it should be noted that the dimensions of the extensions do not increase with the increase in the diameter of the nut, but they are maintained substantially the same for all sizes of nuts.

With a small nut, for example, there will be employed four extensions per washer, with a slightly larger nut six extensions, with one still larger, for example, eight extensions and so on, the size of the extensions being kept practically constant for all the nuts.

As these extensions 3 work in fact edgewise, they can support very big strains without being damaged.

Amongst the other advantages of the double washer according to the invention, there is the advantage that it is not necessary for the washer to be made of high quality steel, but it is sufficient for it to be made of a good constructional steel.

In addition, while it is essential with the known locking washers that the tempering should be very accurately carried out, this is not the case with my washers.

Once the points of the washer according to the invention have penetrated into the pieces with which they co-act, even if the washer softens owing to its being in the neighbourhood of sources of heat it will also maintain its grip.

On the contrary, when other known types of washers soften, they relax and permit the nut to loosen itself.

Another important advantage of the washer according to the invention is that the two single washers may be made from thin sheets even for large nuts, precisely because there is a good grip on the part of the points, even when these penetrate to a slight extent, for example even to the extent of half a millimetre only, into the co-acting surface, and there is also a very effective interlocking of the extensions for any strain whatsoever, since the extensions work edgewise.

A still further advantage of the invention is that, when the nut is tightened up, even an unskilled operator will be aware if the double washer is in good condition; in fact, in such a case, if the double washer can be seen its good working order can be ascertained by the fact that the washer which co-acts with the fixed part is at rest, while the washer which co-acts with the nut follows the movement of the nut itself.

If the washer cannot be seen, its good working order can be ascertained by the fact that small successive sounds are perceived each time that the inclined portions of the extensions of one washer jump in the spaces between the extensions of the other washer.

The size of the extensions in the direction perpendicular to the radius may be equal to that of the space between two successive extensions, but it is preferable for the extension to be somewhat larger than the said space, so as to prevent any interlocking of the two washers in the direction of the tightening-up of the nut.

It will be obvious to those skilled in the art that the double washer according to the invention can be used without any prior preparation of the fixed part D, as is necessary with other known types of washers, with which it is for example necessary to make small recesses in the stationary part.

This does not prevent the advantageous use in the case of emergency of only one single washer in accordance with the invention by arranging it with the projections 2 towards the nut and making on the fixed part D one or more recesses for engaging the rear edge of one or more extensions 3.

The type of washer shown in Figs. 4 and 5 is employed for steel nuts of such a hardness that they cannot be notched by the projecting points of the type of washer shown in Figs. 1 and 3. It is to be noted, however, that this type of washer in accordance with Figs. 4 and 5 is employed for the single nut, while the washer co-acting with the part on which the nut has to be tightened is of the type previously described.

In the form shown in Figs. 4 and 5, the annular part 1' is of an external diameter which is greater than the diameter of the circle circumscribed to the co-acting nut. The washer is provided with the usual extensions 3 identical with those of the washer which has been already described. The sole difference is that, in place of the upwardly turned points, there are provided upwardly-folded portions 4, which are arranged in such a way as to receive exactly between them the nut C. The nut C is therefore set fast between the portions 4, and when it is tightened up it takes the washer with it in its movement. For the remnant the operation is exactly the same as has been described for the embodiment shown in Figs. 1 to 3.

What I claim is:

1. A locking device composed of two oppositely disposed identical washers, each washer including an annular body, a series of spring tongues extending circumferentially in one direction and having the ends thereof deflected laterally of one face of the body, a series of biting teeth projecting from the opposite face of the body and facing in the same circumferential direction as said tongues, the tongues of one washer interlocking with the tongues of the other washer to limit retrograde movement of the nut.

2. A locking device composed of two oppositely disposed identical washers, each washer including an annular body, a series of spring tongues extending circumferentially in one direction and having the ends thereof deflected laterally of one face of the body, a series of biting teeth projecting from the opposite face of the body and facing in the same circumferential direction as said tongues, the teeth of the respective washers being adapted to grip the work and the nut whereby one washer is rotated relative to the other and the spring tongues snap past one another during advance of the nut, said tongues interlocking with each other to limit retrograde movement of the nut.

IGINO GUIDUCCI.